United States Patent
Sasaki et al.

(10) Patent No.: US 7,514,629 B2
(45) Date of Patent: Apr. 7, 2009

(54) ELECTRICAL CONNECTION BOX

(75) Inventors: Yoshikazu Sasaki, Yokkaichi (JP); Yukinori Kita, Yokkaichi (JP)

(73) Assignees: Autonetworks Technologies, Ltd., Mie (JP); Sumitomo Wiring Systems, Ltd., Mie (JP); Sumitomo Electric Industries, Ltd, Osaka (JP)

( * ) Notice: Subject to any disclaimer, the term of this patent is extended or adjusted under 35 U.S.C. 154(b) by 256 days.

(21) Appl. No.: 11/587,169

(22) PCT Filed: Apr. 20, 2006

(86) PCT No.: PCT/JP2006/308322

§ 371 (c)(1),
(2), (4) Date: Oct. 23, 2006

(87) PCT Pub. No.: WO2006/115173

PCT Pub. Date: Nov. 2, 2006

(65) Prior Publication Data
US 2007/0240894 A1 Oct. 18, 2007

(30) Foreign Application Priority Data
Apr. 21, 2005 (JP) ............................. 2005-124016

(51) Int. Cl.
*H02G 3/08* (2006.01)

(52) U.S. Cl. .......................... 174/50; 174/521; 174/59; 439/76.1; 439/76.2; 439/949; 361/752

(58) Field of Classification Search .................. 174/50, 174/59, 559, 58, 53, 17 R, 54, 61, 521, 60; 439/76.1, 76.2, 701, 949, 557, 638, 248, 439/206; 361/600, 601, 752, 729
See application file for complete search history.

(56) References Cited

U.S. PATENT DOCUMENTS

| | | | | |
|---|---|---|---|---|
| 6,919,509 B2 * | 7/2005 | Oda | ............................ | 174/59 |
| 7,074,053 B2 * | 7/2006 | Kawakita et al. | ........... | 439/76.1 |
| 7,104,810 B2 * | 9/2006 | Kawakita et al. | ........... | 439/76.2 |
| 7,189,082 B2 * | 3/2007 | Fukushima et al. | ........... | 174/50 |
| 7,244,141 B2 * | 7/2007 | Yamane et al. | ............. | 439/76.1 |
| 7,351,911 B2 * | 4/2008 | Chiriku et al. | ................ | 174/60 |
| 7,357,650 B2 * | 4/2008 | Sasaki et al. | ............... | 439/76.2 |
| 7,364,438 B2 * | 4/2008 | Sasaki et al. | ............... | 439/76.1 |
| 2003/0137813 A1 | 7/2003 | Onizuka et al. | | |

FOREIGN PATENT DOCUMENTS

| | | |
|---|---|---|
| JP | A 10-035375 | 2/1998 |
| JP | A 2000-261934 | 9/2000 |
| JP | A 2002-152943 | 5/2002 |
| JP | A 2003-164039 | 6/2003 |
| JP | A 2003-224918 | 8/2003 |
| JP | A 2003-324823 | 11/2003 |

* cited by examiner

*Primary Examiner*—Angel R Estrada
(74) *Attorney, Agent, or Firm*—Oliff & Berridge, PLC

(57) ABSTRACT

A fuse block 23 includes a main body portion 34, which is arranged along a top edge portion 21a of a frame 21, and an arm portion 35, which extends from an end of the main body portion 34 along a side edge portion 21b of the frame 21 that is roughly orthogonal to the top edge portion 21a. The mutual engagement of rocking restricting portions 31 and 41 that are provided on the side edge portion 21b of the frame 21 and the arm portion 35 restricts displacement of the arm portion 35 in relation to the side edge portion 21b of the frame 21 in a direction orthogonal to the length direction of the side edge portion 21b. This prevents rocking of the fuse block 23 in which the top edge portion 21a of the frame 21 serves roughly as a fulcrum.

4 Claims, 11 Drawing Sheets

ELECTRICAL CONNECTION BOX

TECHNICAL FIELD

The present invention relates to an electrical connection box.

BACKGROUND ART

Cases are known in which an electrical connection box that is mounted in an automobile has a structure in which a circuit assembly is included in a case. The circuit assembly includes a circuit board, bus bars wired into the circuit along the reverse face of the circuit board, and switching members such as relays and the like that are mounted on the obverse side of the circuit board. The case includes a roughly rectangular frame that is secured in position around a perimeter edge of the circuit board, a cover that is mounted so as to cover the circuit board from the obverse side in relation to the frame, a heat sink that is affixed to the reverse face of the circuit board and that covers the opening on the reverse side of the frame, and a long, narrow fuse block that is mounted along one side of the frame. An example of such an electrical connection box is disclosed in Patent Document 1.

[Patent Document 1] Japanese Patent Application Publication No. JP-A-2003-164039

In a structure where the long, narrow fuse block is mounted along one edge of the frame, if the fuse block is affixed to the frame at two points along the length of the fuse block, the two points being separated by an interval, oblique displacement of the fuse block in relation to the side of the frame can be restricted. However, it is difficult to restrict rocking of the fuse block in which the edge of the frame serves as a fulcrum.

SUMMARY

The present invention has been completed in view of the circumstances described above. It is an object of the present invention to restrict the rocking of the fuse block in relation to the frame.

As a way of achieving the object described above, the present invention is characterized by including a circuit assembly having a circuit board; a case for accommodating the circuit assembly; a roughly rectangular frame that is a component element of the case and that is arranged around a perimeter edge of the circuit board; a fuse block that is a component element of the case and that is arranged along an edge of the frame; a main body portion that is a component element of the fuse block and that is arranged along a roughly horizontal top edge portion of the frame; an arm portion that is a component element of the fuse block and that extends downward from an end of the main body portion along a side edge portion that is roughly orthogonal to the top edge portion of the frame; and rocking restricting portions that are formed in the side edge portion of the frame and in the arm portion and that can engage with one another, by which mutual engagement the rocking restricting portions restrict displacement of the arm portion in relation to the side edge portion in a direction orthogonal to the length direction of the side edge portion.

The mutual engagement of the rocking restricting portions that are provided on the frame side edge portion and the arm portion restricts displacement of the arm portion in relation to the frame side edge portion in a direction orthogonal to the length direction of the side edge portion. This makes it possible to restrict rocking of the fuse block in which the top edge portion of the frame serves roughly as a fulcrum.

BRIEF EXPLANATION OF THE SYMBOLS

Pa ELECTRICAL CONNECTION BOX
10 CIRCUIT ASSEMBLY
11 CIRCUIT BOARD
20 CASE
21 FRAME
21*a* TOP EDGE PORTION
21*b* SIDE EDGE PORTION
23 FUSE BLOCK
31 ROCKING RESGTRICTING PORTION
32 CONTACT PORTION
34 MAIN BODY PORTION
35 ARM PORTION
38 FIRST DRAINAGE GROOVE
39 SECOND DRAINAGE GROOVE
41 ROCKING RESGTRICTING PORTION
42 CONTACT PORTION
44 DRAINAGE CHANNEL
47 PROJECTING PORTION

DETAILED DESCRIPTION OF THE INVENTION

ILLUSTRATIVE EXAMPLE 1

Figure 1:
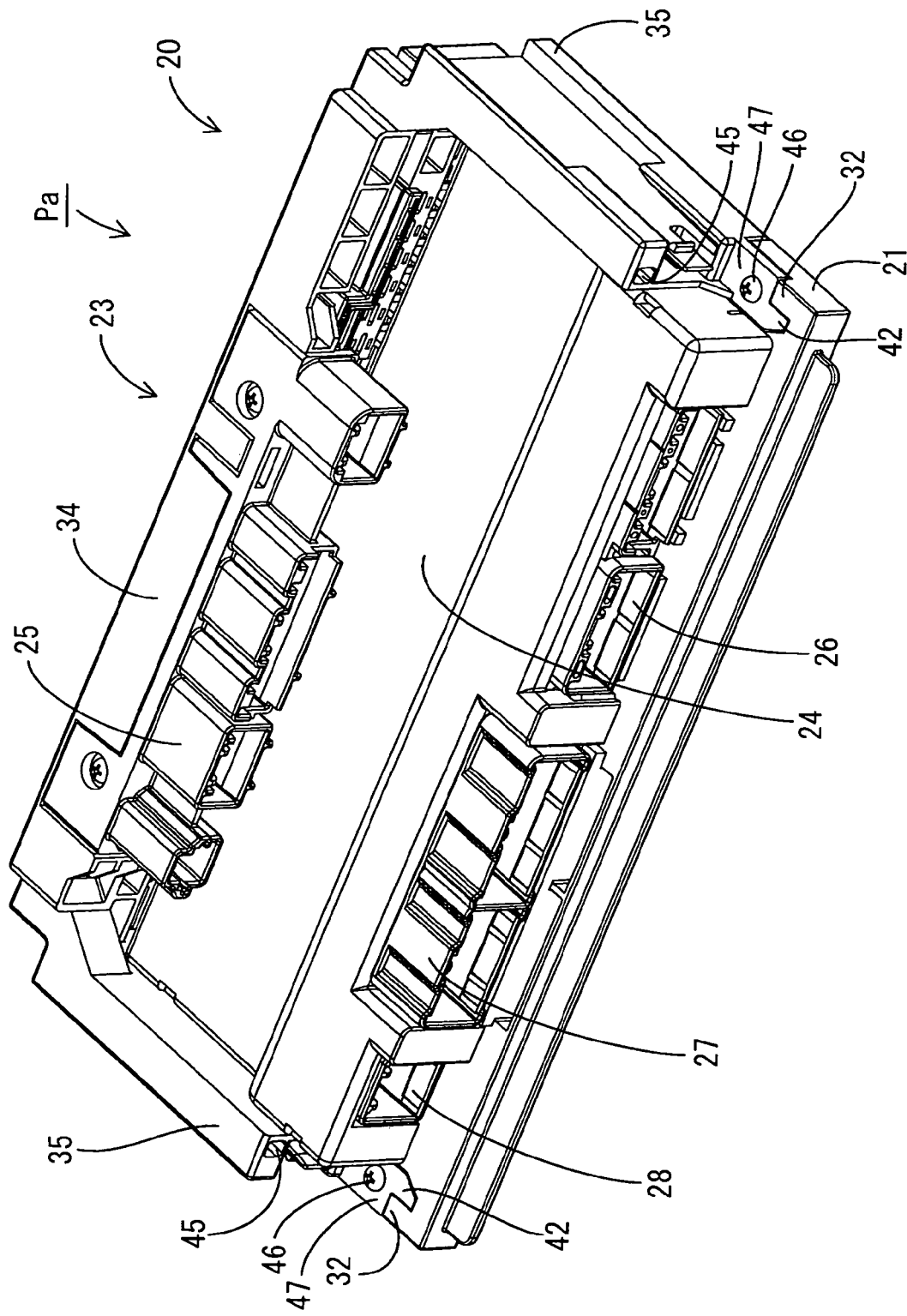
FIG. 1 is an oblique perspective view showing an assembled state in accordance with a first illustrative example of the present invention.
Figure 2:
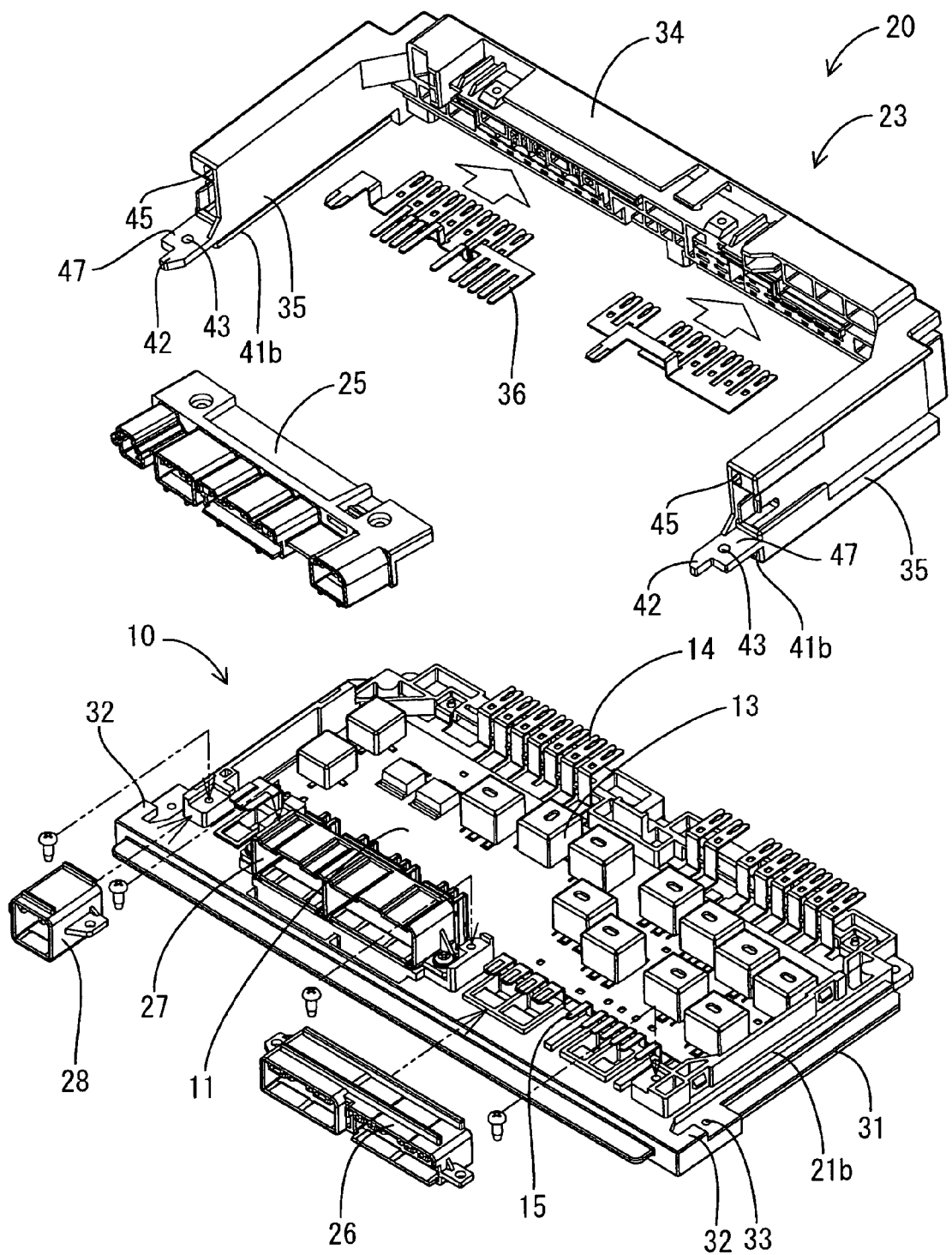
FIG. 2 is an exploded oblique perspective view.
Figure 3:
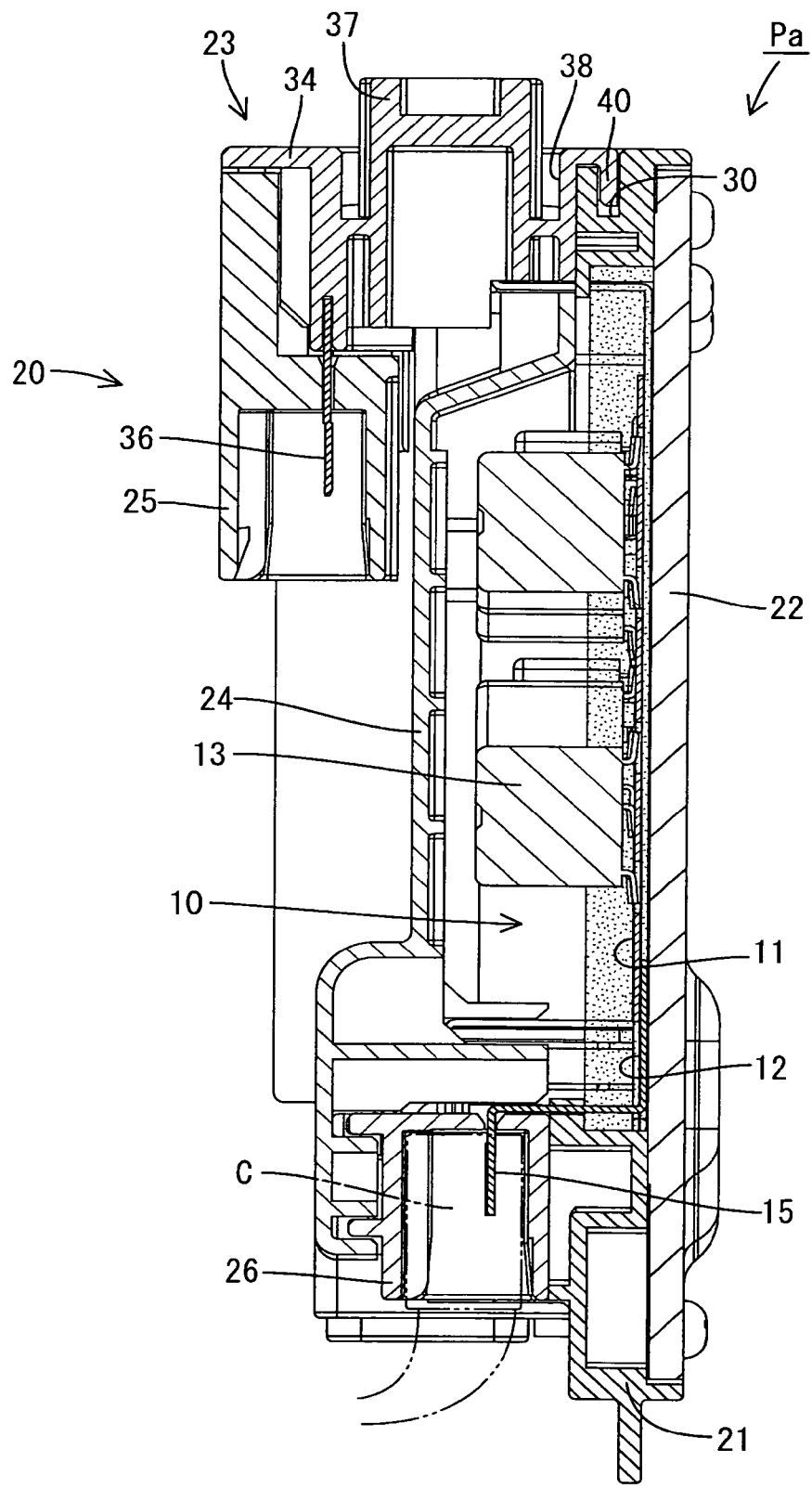
FIG. 3 is a vertical sectional view.
Figure 4:
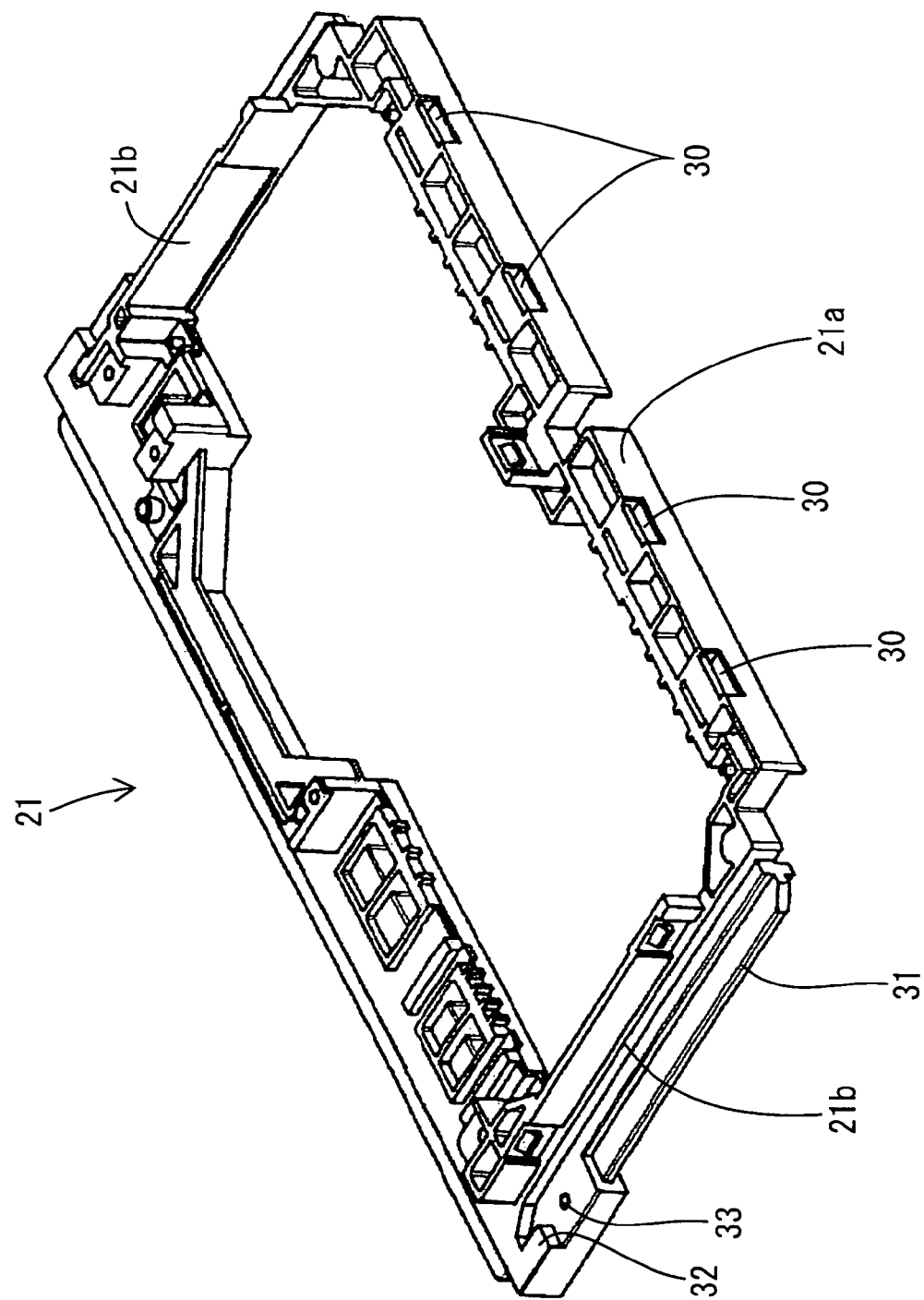
FIG. 4 is an oblique perspective view of a frame.
Figure 5:
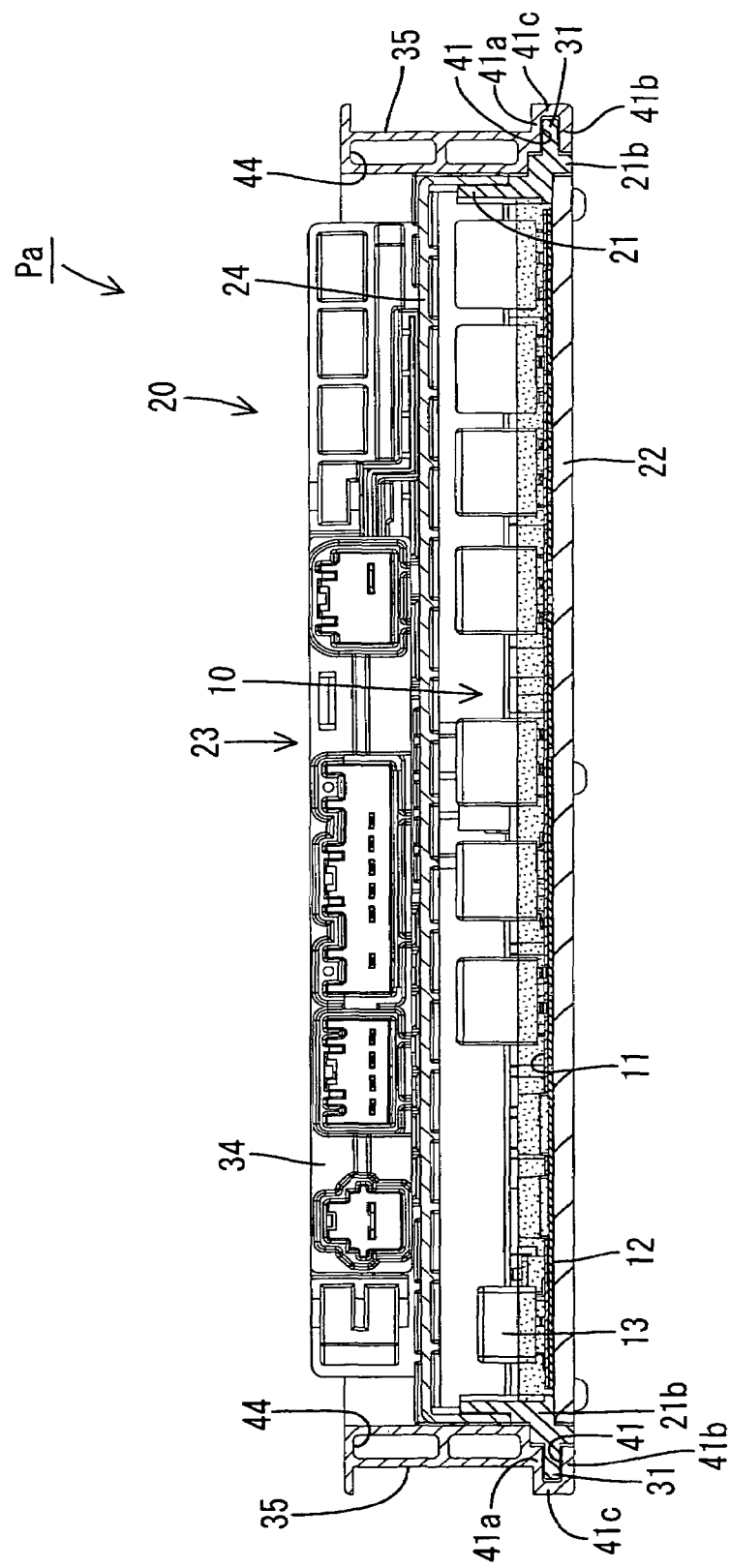
FIG. 5 is a horizontal sectional view.
Figure 6:
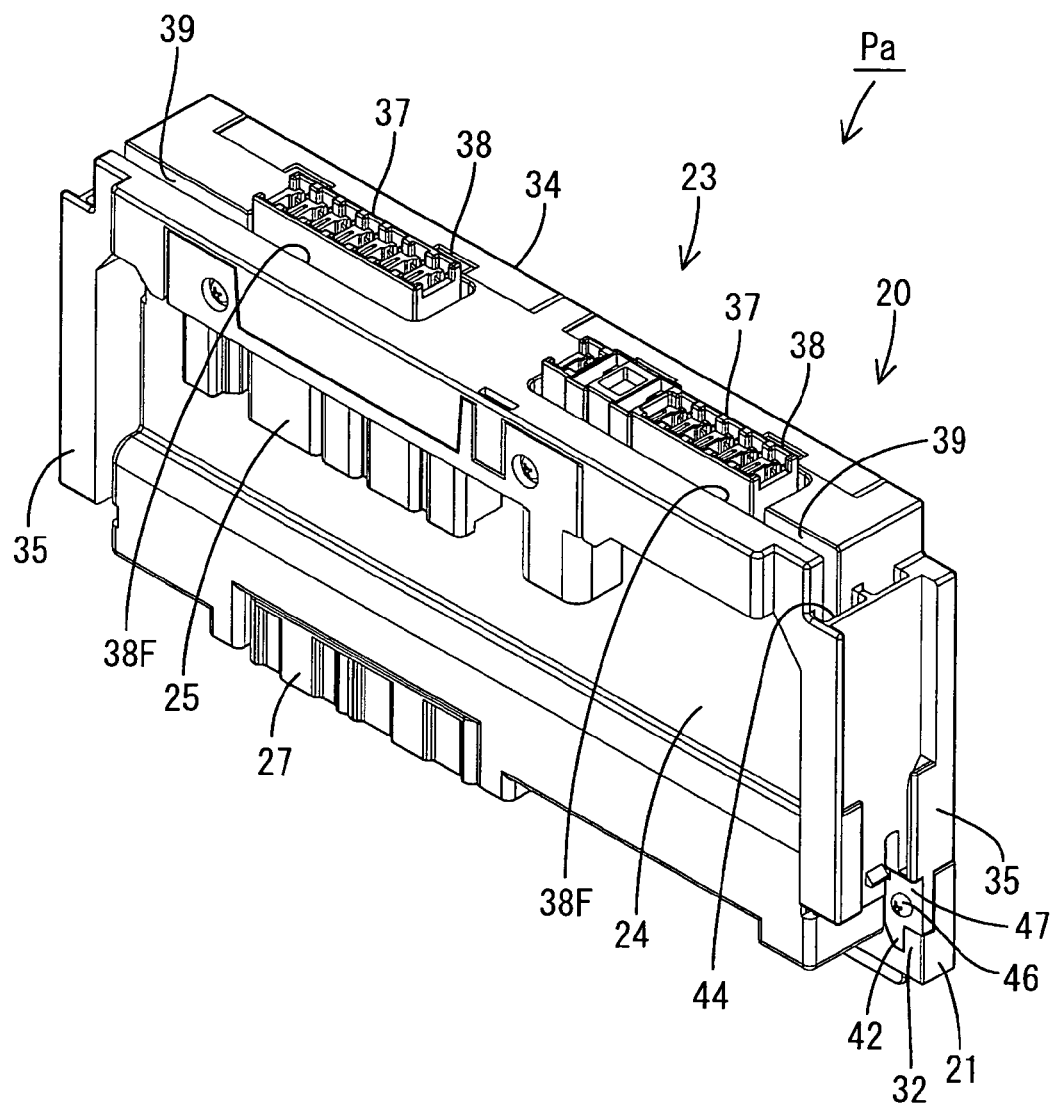
FIG. 6 an oblique perspective view showing the orientation in which the present invention is mounted in an automobile.

Illustrative example 1, which embodies the present invention, is explained with reference to FIG. 1 through FIG. 6. In this illustrative example, an electrical connection box Pa is mounted in an automobile, positioned between a battery (not illustrated) and electrical equipment such as lamps, audio, and the like (not illustrated). The electrical connection box Pa not only takes electric power supplied by the battery and distributes it to the electrical equipment, but also controls the switching and the like of the electric power supply to each piece of equipment. In FIG. 1 through FIG. 4, the electrical connection box Pa is drawn so that its obverse (front) side faces upward, but in its installed state in an automobile, the electrical connection box Pa is oriented such that a main body portion 34 of a fuse block 23 is positioned on the top side and arm portions 35 of the fuse block 23 extend downward. Hereinafter, the up-down and left-right orientations are explained using the installed state in an automobile as the reference.

The electrical connection box Pa includes a circuit assembly 10 and a case 20 that includes the circuit assembly 10.

The circuit assembly 10 includes a circuit board 11, a plurality of bus bars 12 that are wired into the circuit along the reverse face (the bottom face in FIG. 5) of the circuit board 11, and switching members 13, such as relays and the like, that are mounted on the obverse side (the top side in FIG. 5) of the circuit board 11. The bus bars 12 are bonded to the reverse face of the circuit board 11. A plurality of first terminal portions 14 that are formed on the ends of the bus bars 12 project from the top edge of the circuit board 11. In the same manner, second terminal portions 15 that are formed on the ends of the bus bars 12 project from the bottom edge of the circuit board 11.

The case 20 includes a frame 21, a heat sink 22, a fuse block 23, a cover 24, a first housing 25, and second through fourth housings 26, 27, and 28. The frame 21 is made of insulating material such as synthetic resin or the like and is formed into a roughly rectangular frame shape. The heat sink 22 is made of metal and is fixed to the frame 21 such that it covers the opening on the reverse side of the frame 21. The fuse block 23 is made of synthetic resin and is attached to the frame 21 from the obverse side of the frame 21. The cover 24 is made of synthetic resin and is attached to the frame 21 such that it covers the opening on the obverse side of the frame 21 (the opposite side from the heat sink 22). The first housing 25 is made of synthetic resin and is attached to the fuse block 23. The second through fourth housings 26, 27, and 28 are made of synthetic resin and are attached to the bottom edge portion of the frame 21. The heat sink 22 is roughly similar in shape to the circuit board 11, and the reverse faces of the bus bars 12 are bonded by adhesive to the obverse face of the heat sink 22.

The frame 21 is roughly rectangular in its overall shape, and it is arranged so that it surrounds the entire circumference of the circuit assembly 10 continuously along the outer edge of the circuit board 11. The frame 21 is also fixed to the obverse face of the heat sink 22 by means of adhesive (not illustrated). The plurality of first terminal portions 14 are arranged such that they are lined up side by side along the roughly horizontal top edge portion 21a of the frame 21. A plurality of retainer slots 30 are formed at intervals along the top edge portion 21a of the frame 21. The retainer slots 30 are shaped like slits that are open on the top side of the edge portion 21a.

The frame 21 includes a pair of side edge portions 21b that extend downward from the left and right ends of the top edge portion 21a and are roughly perpendicular to the top edge portion 21a. Rib-shaped rocking restricting portions 31 are formed on the outer sides of both the left and right side edge portions 21b and extend in continuous straight lines in the up-down direction (the direction parallel to the direction in which the fuse block 23 is attached to the frame 21 and parallel to the length direction of the side edge portions 21b). The rocking restricting portions 31 are formed such that they extend from the top ends of the side edge portions 21b to close to the bottom end portions of the side edge portions 21b. At the bottom end portions of the side edge portions 21b, contact portions 32 are formed below the bottom ends of the rocking restricting portions 31. Between the bottom ends of the rocking restricting portions 31 and the contact portions 32, threaded holes 33 are formed whose axes are oriented in the front-back direction (the direction perpendicular to the length direction of the rocking restricting portions 31 and perpendicular to the direction of contact between the contact portions 32 and contact portions 42, described below).

The fuse block 23 includes the long and narrow main body portion 34, which is arranged along the top edge portion 21a of the frame 21, and the pair of arm portions 35, which are shaped like cantilevers and extend downward roughly perpendicularly from the left and right ends of the main body portion 34.

The top ends of the first terminal portions 14, roughly the top halves of terminal fittings 36, and fuses (not illustrated) that connect the first terminal portions 14 and the terminal fittings 36 are positioned within the main body portion 34. Accommodation portions 37, each having two chambers, left and right, include a fuse, and are formed in the top side of the main body portion 34. The accommodation portions 37 are formed such that they project in a rectangular block shape from the top side of the main body portion 34 and are open on the top. Also on the top side of the main body portion 34, two first drainage grooves 38 are formed in the shape of rectangular frames that follow the outer perimeter surface of each accommodation portion 37 and surround the entire circumference of each accommodation portion 37. Two second drainage grooves 39 are also formed on the top side of the main body portion 34, extending from the ends of front grooves 38F of the first drainage grooves 38 so as to extend the front grooves 38F toward the arm portions 35. A plurality of flat-shaped retainer projections 40 that project downward are also formed at intervals along the main body portion 34 in the left-right direction.

Groove-shaped rocking restricting portions 41 that extend in straight lines in the up-down direction are formed on the inner side surfaces of the left and right arm portions 35 (the surfaces that face the side edge portions 21b of the frame 21). The rocking restricting portions 41 are formed roughly in the shape of a letter U and include front walls 41a located on the front side, rear walls 41b located on the rear guides, and connecting walls 41c that connect the outer edges of the front walls 41a and the rear walls 41b. The rocking restricting portions 41 are formed so that they are continuous from the top ends (base ends) of the arm portions 35 to a position slightly above the bottom ends (extended ends) of the arm portions 35. The bottom ends of the arm portions 35 (the ends below the bottom ends of the rocking restricting portions 41) form flat projecting portions 47 that project even further below the bottom ends of the rocking restricting portions 41. The projecting portions 47 are formed such that they extend flush with the front walls 41a of the rocking restricting portions 41. The contact portions 42 are formed at the bottom ends of the projecting portions 47 and are narrower than the projecting portions 47. Between the bottom ends of the rocking restricting portions 41 and the contact portions 42, threaded through-holes 43 are formed whose axes are oriented in the front-back direction.

A drainage channel 44 that extends in the up-down direction (the direction parallel to the direction of extension of the arm portions 35) is formed on the outer side surface of each arm portion 35. The drainage channel 44 extends from the top end to the bottom end of the arm portion 35. The greater part of the drainage channel 44, with the exception of its top end, forms a through-hole in the up-down direction that is enclosed on the front, back, left, and right sides. The top end of the drainage channel 44 is continuous with the end of the second drainage groove 39. The bottom end of the drainage channel 44 is open to form a drainage outlet 45.

The fuse block 23 is attached to the frame 21 by moving it toward the frame 21 from above in a direction parallel to the length direction of the arm portions 35 and the side edge portions 21b of the frame 21. In the attachment process, both arm portions 35 slide on the outer side surfaces of the left and right side edge portions 21b of the frame 21. (The arm portions 35 sandwich the frame 21 from the left and right.) This process positions the fuse block 23 in the left-right direction. The process also causes the rocking restricting portions 31 and 41 of the frame 21 and the fuse block 23 to engage with one another. This restricts the displacement of the arm portions 35 in relation to the side edge portions 21b of the frame 21 in the front-back direction that is orthogonal to the length direction. It also positions the fuse block 23 in relation to the frame 21 in the front-back direction. The engagement of the rocking restricting portions 31 and 41 also guides the fuse block 23 to its prescribed attachment position in relation to the frame 21.

When the fuse block 23 reaches the proper attachment position, the retainer projections 40 on the main body portion 34 engage with the retainer slots 30 on the top edge portion 21a of the frame 21. The main body portion 34 is thus attached to the top edge portion 21a of the frame 21 in a state where its displacement is restricted in the front-back direction (the direction roughly perpendicular to the length direction of the top edge portion 21a of the frame 21 and the main body portion 34) and the left-right direction (the direction roughly parallel to the length direction of the top edge portion 21a of the frame 21 and the main body portion 34). The contact portions 42 at the bottom ends of the arm portions 35 make contact from the side with the contact portions 32 of the side edge portions 21b of the frame 21. The effect of this contact is to restrict the separation of the arm portions 35 from the side edge portions 21b of the frame 21 in the left-right direction (the direction roughly parallel to the length direction of the top edge portion 21a of the frame 21 and the main body portion 34). Fastening of screws 46 into the threaded holes 33 in the frame 21 through the threaded holes 43 in the arm portions 35 secures the arm portions 35 to the side edge portions 21b of the frame 21 in a state where their displacement is restricted in the front-back, left-right, and up-down directions. The attachment of the fuse block 23 to the frame 21 is thus complete.

The first housing 25 is attached to the main body portion 34 of the fuse block 23 from below. Roughly the bottom halves of the terminal fittings 36 are positioned within the first housing 25. The fitting tube portions of the first housing 25 are open facing downward. The second through fourth housings 26, 27, and 28 are secured by screws to the obverse face (front face) of the bottom edge portion of the frame 21 and have fitting tube portions that are open facing downward. Wiring harness connectors C are fitted into the fitting tube portions of the first through fourth housings 25, 26, 27, and 28.

The cover 24 has an overall shape that is almost the same as that of the circuit board 11, but it is slightly larger than the circuit board 11 in both length and width. The cover 24 is attached to the frame 21 from the front side before the fuse block 23 is attached to the frame 21. In its attached state, the cover 24 covers and conceals the circuit board 11 and the switching members 13 that are accommodated within the frame 21.

In this illustrative example, the fuse block 23 is structured such that it includes the main body portion 34, which is arranged along the top edge portion 21a of the frame 21, and the pair of arm portions 35, which extend from the left and right ends of the main body portion 34 along the side edge portions 21b of the frame 21. The side edge portions 21b of the frame 21 and the arm portions 35 are provided with rocking restricting portions 31 and 41, which, by engaging one another, restrict the displacement of the arm portions 35 in relation to the side edge portions 21b in the front-back direction that is orthogonal to the length direction of the side edge portions 21b. Therefore, the mutual engagement of the rocking restricting portions 31 and 41 restricts rocking of the fuse block 23 in the front-back direction (the up-down direction in FIG. 5) in which the top edge portion 21a of the frame 21 or the main body portion 34 of the fuse block 23 serves roughly as a fulcrum.

The rocking restricting portions 31 and 41 are formed such that they extend in straight lines along the length directions of the side edge portions 21b of the frame 21 and the arm portions 35. The fuse block 23 is attached to the frame 21 by moving it toward the frame 21 in a direction roughly parallel to the length direction of the arm portions 35 and the side edge portions 21b of the frame 21, with the fuse block 23 oriented such that the bottom ends (extended ends) of the arm portions 35 constitute the leading edges of the fuse block 23. As a result, when the fuse block 23 is attached to the frame 21, the rocking restricting portions 31 and 41 engage one another, stabilizing the orientation of the fuse block 23 in relation to the frame 21 and guiding the fuse block 23 to its prescribed attachment position. The workability of the attachment process is therefore good.

The side edge portions 21b of the frame 21 and the arm portions 35 are provided with contact portions 32 and 42, which, by being in contact with one another, restrict the separation of the arm portions 35 from the side edge portions 21b in the left-right direction (the direction roughly orthogonal to the direction of restriction by the rocking restricting portions 31 and 41). The mutual contact between the contact portions 32 and 42 prevents slippage between the rocking restricting portions 31 and 41, so that the rocking restricting portions 31 and 41 restrict rocking of the fuse block 23 more reliably.

The fuse block 23 is arranged such that the main body portion 34 is in a roughly horizontal orientation and the arm portions 35 are oriented such that they extend downward. The first and second drainage grooves 38 and 39 are formed on the top side of the main body portion 34, and the drainage channels 44, which are continuous with the first and second drainage grooves 38 and 39, are provided in the arm portions 35. This arrangement makes it possible for water that accumulates on the top side of the main body portion 34 to be drained to the bottoms of the arm portions 35 via the first and second drainage grooves 38 and 39 and the drainage channels 44. Moreover, the arm portions 35, which are a way of restricting the rocking of the fuse block 23, also serve as the structures that form the drainage channels 44. The shape of the fuse block 23 is thus made simpler than a structure in which drainage channels are provided separately from the arm portions 35.

ILLUSTRATIVE EXAMPLE 2

Figure 7:
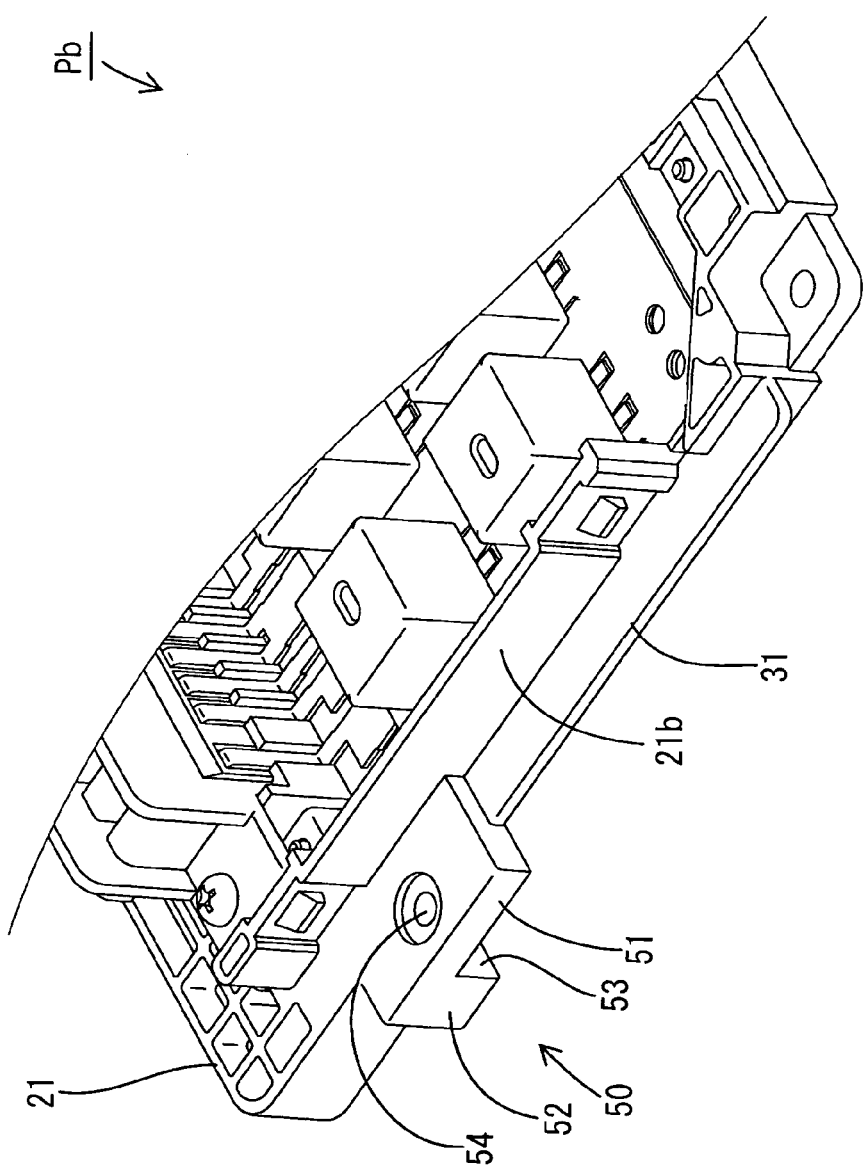
FIG. 7 is an oblique perspective view showing a side edge portion of a frame in accordance with a second illustrative example of the present invention.
Figure 8:
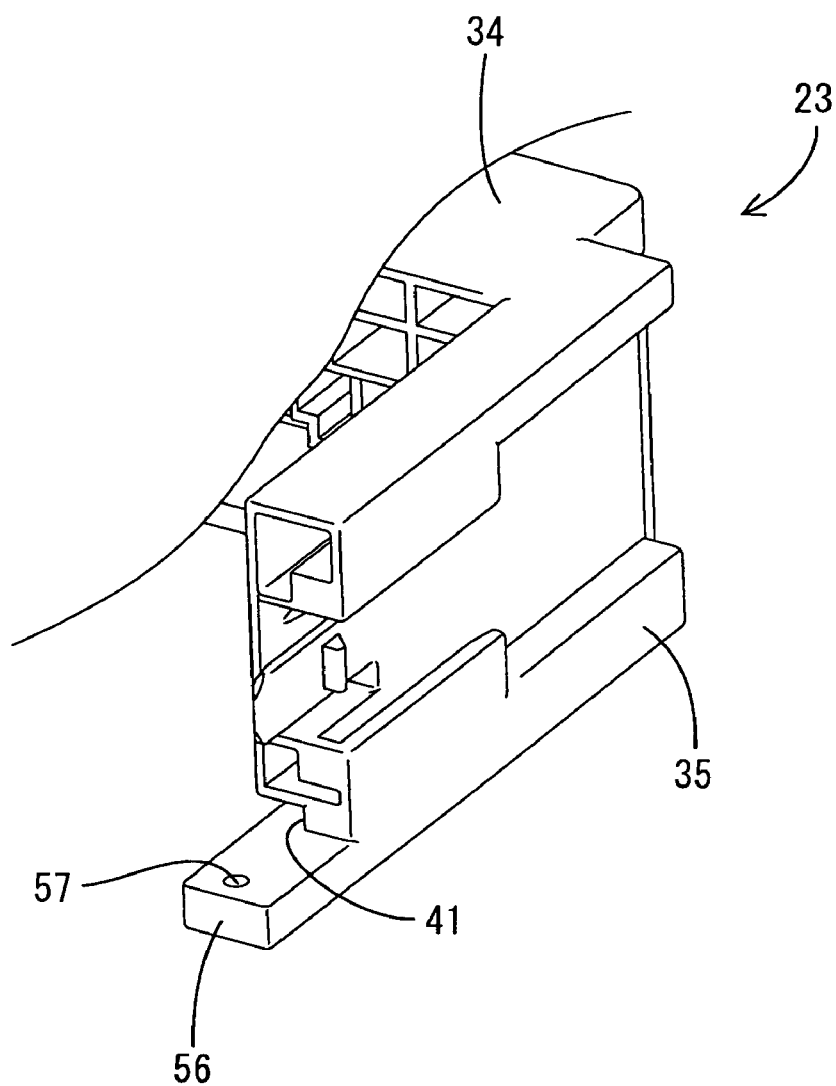
FIG. 8 is an oblique perspective view showing an arm portion.
Figure 9:
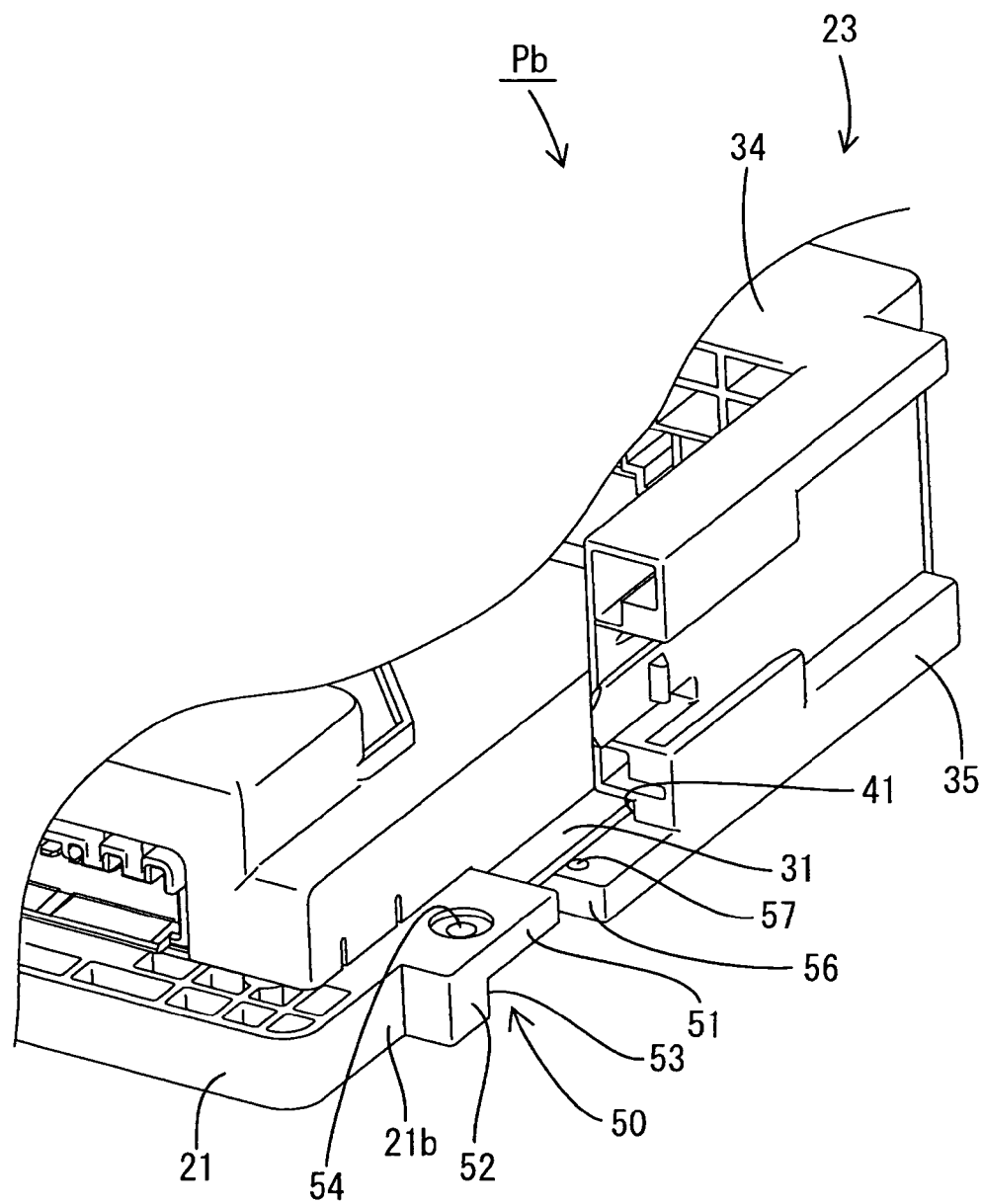
FIG. 9 is an oblique perspective view showing a fuse block in the process of being attached to the frame.
Figure 10:
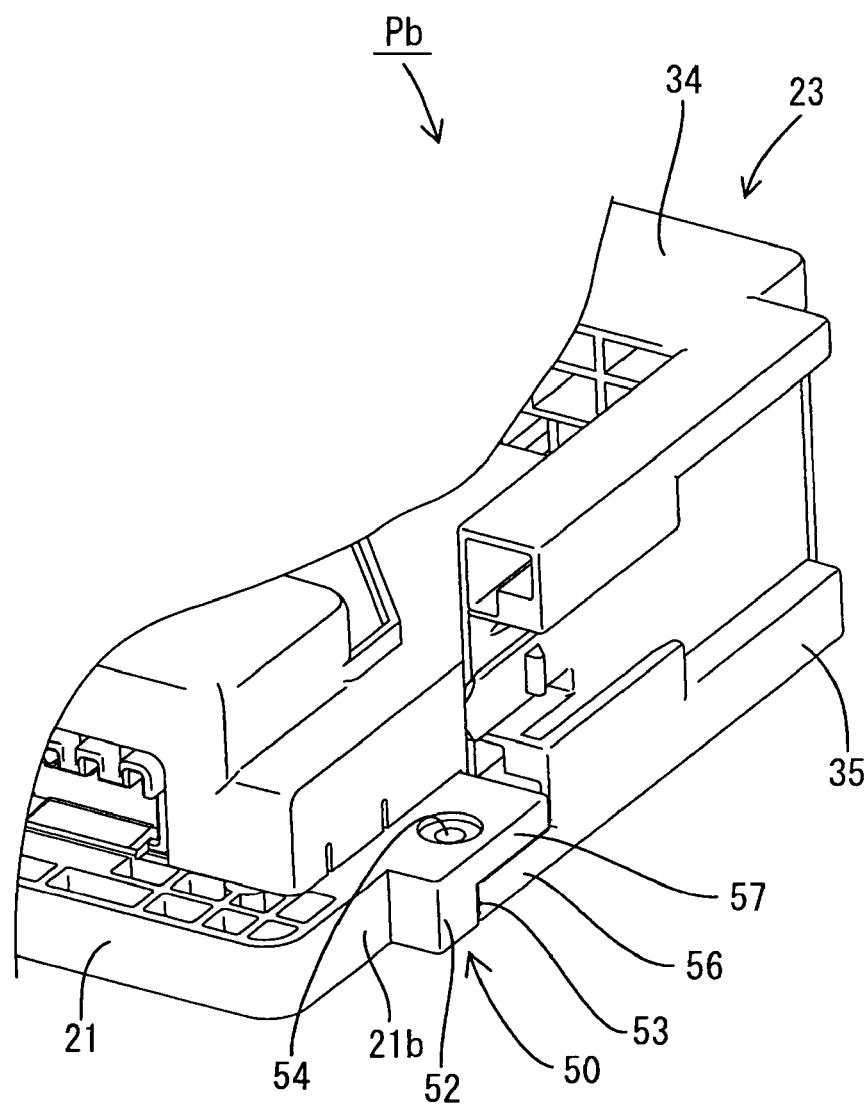
FIG. 10 is an oblique perspective view showing the fuse block in a state of attachment to the frame.
Figure 11:
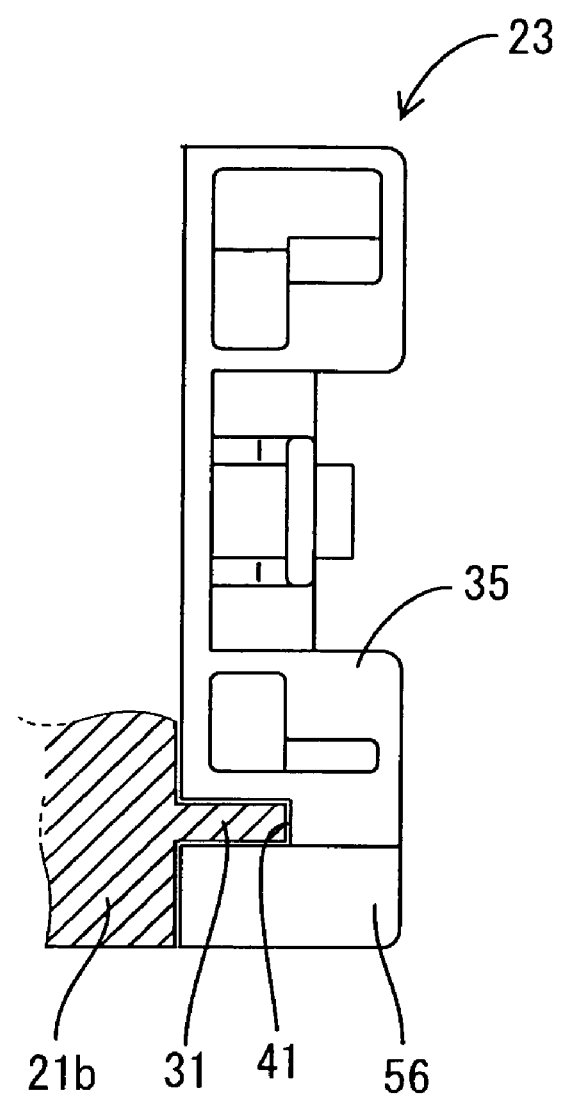
FIG. 11 is a sectional view showing a rocking restricting portion on the frame side and a rocking restricting portion on the arm side in a state of being fitted together.

Illustrative example 2, which embodies the present invention, is explained with reference to FIG. 7 through FIG. 11. In illustrative example 2, an electrical connection box Pb has a configuration in which the bottom end portions of arm portions 35 and the bottom end portions of side edge portions 21b of a frame 21 are shaped differently from their counterparts in illustrative example 1. All other structures are the same as in illustrative example 1, so for the same structures, the same symbols are used, and explanations of their structures, operations, and effects are omitted.

Rib-shaped rocking restricting portions 31 are formed on the outer sides of both the left and right side edge portions 21b of the frame 21 and extend in continuous straight lines in the up-down direction (the direction parallel to the direction in which a fuse block 23 is attached to the frame 21 and parallel to the length direction of the side edge portions 21b). The rocking restricting portions 31 are formed such that they extend from the top ends of the side edge portions 21b to close to the bottom end portions of the side edge portions 21b. At the bottom end portions of the side edge portions 21b, fitting portions 50 are formed below the bottom ends of the rocking restricting portions 31.

The fitting portions 50 include flat portions 51 and projecting portions 52. The flat portions 51 are parallel to the rocking restricting portions 31 and continuous with the bottom ends of the rocking restricting portions 31. The projecting portions 52 project from the bottom ends of the flat portions 51 toward the rear side. When viewed from the side the flat portions 51 and the projecting portions 52 roughly form an L shape. The spaces that are formed like cut-outs to the rear of the flat portions 51 (below the flat portion 51 in FIG. 7, FIG. 9, and FIG. 10) and above the projecting portions 52 (obliquely to the right of and below the projecting portion 52 in FIG. 7) constitute cut-out spaces 53, which are open to the rear and to the outer sides of the fitting portions 50. The widths of the flat portions 51 and the projecting portions 52 are the same, and both are greater than the width of the rocking restricting portions 31. The thickness of the flat portions 51 is greater than the thickness of the rocking restricting portions 31. The rear surfaces of the flat portions 51, which face the cut-out spaces 53, are flush with and continuous with the rear surfaces of the rocking restricting portions 31. In the flat portions 51, threaded holes 54, whose axes are oriented in the front-back direction (the direction that is orthogonal to the length direction of the rocking restricting portions 31), are formed so that they pass through the flat portions 51 from the front surface to the rear surface.

Groove-shaped rocking restricting portions 41 that extend in straight lines in the up-down direction are formed like cut-out slits on the inner side surfaces of the left and right arm portions 35 (the surfaces that face the outer side faces of the side edge portions 21b of the frame 21). The rocking restricting portions 41 are formed so that they are continuous from the top ends (base ends) of the arm portions 35 to a position slightly above the bottom ends (extended ends) of the arm portions 35. The bottom ends of the arm portions 35 (the ends below the bottom ends of the rocking restricting portions 41) form flat projections 56 that project even further below the bottom ends of the rocking restricting portions 41. The width of the flat projections 56 is the same as the width of the flat portions 51 and the projecting portions 52. The front surfaces of the flat projections 56 are flush with and continuous with the rear inner surfaces of the rocking restricting portions 41. Female threaded holes 57, whose axes are oriented in the front-back direction, are formed in the flat projections 56.

Next, the operation of this illustrative example is explained.

When attaching the fuse block 23 to the frame 21, the operator stands on the front side of the frame 21 and moves the fuse block 23 toward the frame 21 from above. This action causes the bottom ends of the groove-shaped rocking restricting portions 41 on the arm portions 35 to engage with the top ends of the rib-shaped rocking restricting portions 31 on the frame 21. At this time, the flat projections 56 project from the bottom ends of the groove-shaped rocking restricting portions 41 on the arm portions 35, but because the flat projections 56 are positioned on the rear side of the rocking restricting portions 41, the flat projections 56 are positioned to the rear of the rocking restricting portions 31 during engagement. Therefore, the operator can visually check the positional relationship of the bottom ends (open portions) of the groove-shaped rocking restricting portions 41 and the top ends of the rib-shaped rocking restricting portions 31 from the front side. This makes it possible to engage the rocking restricting portions 41 and the rocking restricting portions 31 easily and reliably.

When the fuse block 23 reaches the proper attachment position in relation to the frame 21, the flat projections 56 are fitted into the cut-out spaces 53. Thus the flat projections 56 are concealed on the rear side of the flat portions 51, and the centers of the threaded holes 54 on the flat portions 51 are aligned with the centers of the female threaded holes 57 on the flat projections 56. Hereafter, if screws (not illustrated) that are inserted into the threaded holes 54 are threaded into the female threaded holes 57 and tightened, the screws fix the bottom end portions of the arm portions 35 and the bottom end portions of the left and right side edge portions 21b of the frame 21 in position.

OTHER ILLUSTRATIVE EXAMPLES

The scope of the present invention is not limited to the illustrative examples explained by descriptions and drawings above. For example, the illustrative examples listed below are included within the technical scope of the present invention.

(1) In illustrative examples 1 and 2, rocking restricting portions are provided on both left and right arm portions, but in accordance with the present invention, a rocking restricting portion may be provided on only the left or right arm portion.

(2) In illustrative examples 1 and 2, arm portions are provided on both left and right ends of a main body portion, but in accordance with the present invention, an arm portion may be provided on only one end of the main body portion.

(3) In illustrative examples 1 and 2, the rocking restricting portions on the frame are rib-shaped (protruding) and the rocking restricting portions on the arm portions are groove-shaped, but in accordance with the present invention, the rocking restricting portions on the frame may be groove-shaped and the rocking restricting portions on the arm portions may be rib-shaped.

(4) In illustrative examples 1 and 2, the fuse block is attached to the frame by moving it toward the frame in the length direction of the arm portions, but in accordance with the present invention, the fuse block may be attached to the frame by moving it toward the frame in a direction orthogonal to the arm portions.

(5) In illustrative examples 1 and 2, the rocking restricting portions are shaped such that they are long and narrow and extend in the length direction of the frame edge portions and the arm portions, and such that they engage with one another during the fuse block attachment process, but in accordance with the present invention, the rocking restricting portions may be designed such that they engage only when the fuse block is in its proper attachment position.

(6) In illustrative example 1, contact portions are provided in the frame and the arm portions, but in accordance with the present invention, a structure in which contact portions are not provided may be used.

(7) In illustrative examples 1 and 2, both threaded holes, which are a way for joining to the edge portions of the frame, and contact portions, which are a way for making contact with the edge portions of the frame, are provided in the projecting portions, but in accordance with the present invention, either threaded holes only or contact portions only may be formed in the projecting portions.

(8) In illustrative examples 1 and 2, the projecting portions are arranged in positions that are offset to the front or rear of the rocking restricting portions (that is, the directions of the rocking that the rocking restricting portions restrict), but in accordance with the present invention, the projecting portions may be arranged in positions that are offset in the direction of separation from the edge portions of the frame in relation to the rocking restricting portions.

(9) In illustrative example 1, the contact portions are formed on the projecting portions, but in accordance with the present invention, the contact portions may be formed separately from the projecting portions.

The invention claimed is:

1. An electrical connection box comprising:
   a circuit assembly having a circuit board;
   a case for including said circuit assembly;
   a roughly rectangular frame that is a component element of said case and that is arranged around a perimeter edge of said circuit board;
   a fuse block that is a component element of said case and that is arranged along said frame;
   a main body portion that is a component element of said fuse block and that is arranged along a roughly horizontal top edge portion of said frame;
   an arm portion that is a component element of said fuse block and that extends downward from an end of said main body portion along a side edge portion that is roughly orthogonal to said top edge portion of said frame;
   rocking restricting portions that are formed in said side edge portion of said frame and in said arm portion and that can engage with one another, by which mutual engagement said rocking restricting portions restrict displacement of said arm portion in relation to said side edge portion in a direction orthogonal to the length direction of said side edge portion;
   a drainage groove that is provided on the top side of said main body portion; and
   a drainage channel that is provided in said arm portion such that said drainage channel is continuous with said drainage groove.

2. The electrical connection box according to claim 1, wherein:
   said fuse block and said frame are attached by moving them toward one another in a direction roughly parallel to the length direction of said side edge portion of said frame and said arm portion; and
   said rocking restricting portions are formed such that they extend in straight lines along the length direction of said side edge portion of said frame and said arm portion.

3. The electrical connection box according to claim 1, wherein:
   contact portions that are provided such as to make mutual contact possible between said side edge portion of said frame and said arm portion, by which mutual contact said arm portion is restricted from separating from said side edge portion in a direction roughly parallel to the length direction of said top edge portion.

4. The electrical connection box according to claim 2, wherein:
   contact portions that are provided such as to make mutual contact possible between said side edge portion of said frame and said arm portion, by which mutual contact said arm portion is restricted from separating from said side edge portion in a direction roughly parallel to the length direction of said top edge portion.

* * * * *